United States Patent [19]
Klein et al.

[11] 4,175,070
[45] Nov. 20, 1979

[54] HIGH CARBON FRICTION MATERIAL

[75] Inventors: Bruce W. Klein, West Bloomfield; Michael G. Jacko, Southfield, both of Mich.

[73] Assignee: The Bendix Corporation, Southfield, Mich.

[21] Appl. No.: 911,848

[22] Filed: Jun. 2, 1978

[51] Int. Cl.$^2$ .......................... C08K 3/04; C08K 3/08; C08K 3/22
[52] U.S. Cl. .......................................... 260/38; 106/36
[58] Field of Search ............... 260/38, DIG. 39, 37 M

[56] References Cited
U.S. PATENT DOCUMENTS

| | | | |
|---|---|---|---|
| 3,477,983 | 11/1969 | Keller | 260/38 |
| 3,832,325 | 8/1974 | Eschen | 260/38 |
| 3,856,120 | 12/1974 | Kwolek et al. | 260/38 X |

Primary Examiner—Sandra M. Person
Attorney, Agent, or Firm—Leo H. McCormick, Jr.; Ken C. Decker

[57] ABSTRACT

A high carbon friction material for use as a friction lining in a brake or clutch. The friction material consists of a combination of fibers selected from a group including glass, asbestos or other mineral fibers, metal powders, friction modifiers and carbon or graphite particles retained in a matrix created by a thermoset phenolic resin to establish a friction lining. The selected fibers and carbon or graphite particles in the friction material jointly combine to establish a substantially uniform wear rate and coefficient of friction up to 500° C. when the friction lining engages a corresponding mating surface.

12 Claims, 25 Drawing Figures

FRICTION MATERIAL COMPOSITION

| INGREDIENTS | A | B | C | D | E | F | G | H | I | J | K | L | M | N |
|---|---|---|---|---|---|---|---|---|---|---|---|---|---|---|
| FIBER MATERIAL ASBESTOS | 50 | 25 | 25 | | | | | | | | | | | |
| GLASS FIBER | | | | 14 | 15 | 15 | 16 | 15 | 15 | 16 | 15 | 15 | 15 | 15 |
| MINERAL FIBER | | | | 14 | 15 | 16 | 16 | 15 | 15 | 17 | 15 | 16 | 15 | 10 |
| ∅ METAL PARTICLES OR POWDER | 5 | 21 | 22 | 19 | 20 | 17 | 17 | 18 | 18 | ᵠ4 | 20 | 21 | 19 | 22 |
| ∅∅ ORGANIC MODIFIERS | 20 | 0 | 4 | 0 | 4 | 4 | 3 | 4 | 4 | 4 | ⊛7 | 4 | 4 | 3 |
| ∅∅∅ INORGANIC MODIFIERS | 12 | *17 | *17 | *16 | *14 | *15 | 8 | *18 | *18 | *24 | *17 | *7 | *15 | *8 |
| CARBON AND/OR GRAPHITE PARTICLES OR POWDER | 0 | 23 | 24 | 23 | 24 | 25 | 31 | **22 | 22 | 26 | 18 | 29 | 24 | 34 |
| PHENOLIC RESIN | 13 | 14 | 8 | 14 | 8 | 8 | 9 | 8 | 8 | 9 | 8 | 8 | 8 | 8 |

∅ ZINC, BRASS, COPPER, IRON, AND OXIDES THEREOF AND ALUMINUM OXIDE
∅∅ CASHEW NUT POWDER, RUBBER, NATURAL LATEX, MOLASSES, ASPHALT, ETC.
∅∅∅ BARYTES, WHITING, TALC, ROTTEN STONE, CRYOLITE, WOLLASTONITE, KRYOLITE, ETC.
* AT LEAST 7% OF WHICH IS BARYTES
** EQUAL AMOUNTS OF SYNTHETIC AND NATURAL GRAPHITES
⊛ AT LEAST 4% OF WHICH IS CASHEW NUT POWDER
ᵠ ALUMINUM OXIDE

FIG. 25

HIGH CARBON FRICTION MATERIAL

BACKGROUND OF THE INVENTION

Organic friction material compositions currently used in clutch and brake linings of vehicles must be capable of withstanding severe operating temperatures and dynamic pressures experienced during repeated applications. To prevent a deterioration in performance and physical degradation during such applications, the linings are normally reinforced by asbestos fibers randomly dispersed throughout a resin matrix. However, recent medical evidence indicates that asbestos fibers can cause health hazards for people exposed thereto during the manufacture of clutch and brake linings. Unfortunately, because of the presence of fine diameter asbestos fiber during the manufacture of brake lining using asbestos fiber, a portion of the asbestos often becomes airborne in quantities that exceed the exposure standard of asbestos fiber in the United States as controlled by the Occupational Safety and Health Act of 1970.

In an effort to reduce the environment contamination by the asbestos fiber and thereby continue the manufacturing asbestos based organic friction linings, a water slurry process disclosed in U.S. patent application Ser. No. 754,477 has been evaluated. The water slurry can be transmitted throughout a manufacturing facility without contaminating the surrounding environment with asbestos fibers. However, before the friction material can be cured, the water in the slurry must be removed in order to be assured that any resulting lining has essentially the same operating characteristics as a lining made from a dry mix. Unfortunately, this process adds considerable cost to the manufacturing cost of a brake or clutch lining, and does not necessarily solve emission problems during finishing and inspection.

In an effort to use readily available materials and the same manufacturing facilities, as currently available, it has been suggested that glass and/or mineral fibers be used in place of at least a portion of the asbestos fillers. U.S. Pat. No. 3,967,037 discloses several lining compositions utilizing glass fiber in place of asbestos. From experimentation, it has been determined such lining compositions in normal operational conditions produce brake noise, severe rotor scoring and wear, and poor friction material life when the lining is mated with a cast-iron rotor or drum.

SUMMARY OF THE INVENTION

We have devised a high carbon friction lining consisting of a reinforcing fiber selected from a combination of asbestos, glass and mineral fibers, metal powders, organic and inorganic friction modifiers, and carbon or graphite particles retained in a matrix created by a thermosetting phenolic resin. When the ratio of the carbon or graphite particles to the glass fiber in the friction lining is about 2:1, a substantially uniform coefficient of friction up to 500° C. without appreciable wear results. In addition, the abrasive effect of the glass fiber on a rotating wear surface is substantially reduced.

It is the object of this invention to provide a friction material for use as a friction lining having carbon and/or graphite particles therein to modify the abrasive effect of asbestos or glass on a corresponding mating surface during a brake application.

It is another object of this invention to provide a friction material having carbon and/or graphite particles therein to stabilize the coefficient of friction over an operational range during engagement of the friction material lining with a mating surface.

It is a further object of this invention to provide a friction material for use as a brake lining having a foundation base material consisting of equal parts by weight of glass and mineral fibers with a sufficient quantity of carbon or graphite particles therein to modify the abrasive effect of the glass fiber on a corresponding mating surface and thereby establish a friction material lining having a substantially uniform coefficient of friction up to 500° C. on engagement with a corresponding wear surface.

These and other objects should be apparent from reading this specification and viewing the drawings.

BRIEF DESCRIPTION OF THE DRAWINGS

FIG. 25 is a table showing the components incorporated into friction materials made according to this invention.

DETAILED DESCRIPTION OF THE INVENTION

Figure 1:
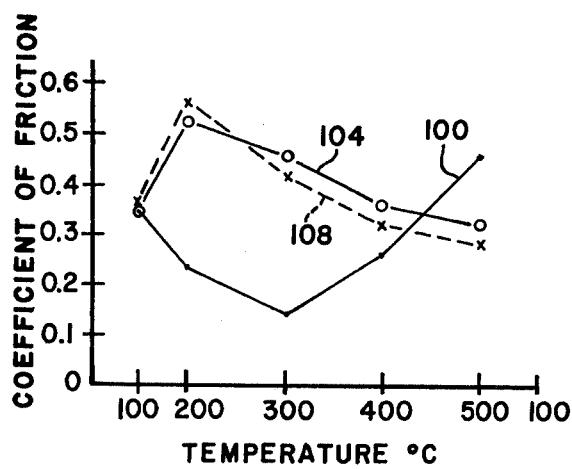
FIGS. 1, 3, 5, 7, 9, 11, 13, 15, 17, 19, 21 and 23 are graphs comparing the coefficient of friction of materials made according to the teachings of this invention with a typical organic friction lining at various temperatures.

In order to evaluate the friction material disclosed by this invention, a typical asbestos friction material A in FIG. 25, was formulated and analyzed to establish a standard or base for illustrating an acceptable coefficient of friction and rate of wear for a brake lining of an automobile.

FIG. 25 also illustrates the modifications associated with the composition of material A to create the high carbon friction material made according to this invention for both asbestos and asbestos free compositions.

The ingredients in the composition of material A and the compositions of materials of this invention were processed into brake friction linings in the following manner as described in detail for the base line or standard composition of material A.

Asbestos fiber, zinc powder, organic modifiers (two parts of cashew nut powder and one part rubber scrap), inorganic modifier (barytes), and dry phenolic resin of composition A, shown in FIG. 25, were mixed together until a homogenous mixture was created. Thereafter this homogenous mixture was placed in a mold and compacted into a briquette. The briquette was then transferred to a press and compressed at about 5,000 pounds per square inch, while the temperature of the briquette was raised to about 275° F. The 275° F. temperature caused the phenolic resin to flow throughout the mixture and establish a matrix for holding the other ingredients in a fixed position. Thereafter, the briquette was transferred to a curing oven having a temperature of about 500° F. to further set the phenolic resin. The rubbing surface of the cured briquette was then gound to a specific size corresponding to a brake pad. This brake pad was mated with a caliper and rotor assembly of a vehicle brake. The caliper and rotor assembly were installed on an inertial dynamometer.

The inertial dynamometer procedure combined performance and wear versus temperature testing with emphasis placed on friction change with increased duty usage typical of solid rotor brakes used on European vehicles and brake types currently being developed for domestic usage on small cars. A 44 mm diameter brake currently used on the 1977 Volkswagon Rabbit was mated with 23 sq cm disc pads having a 9.60 cm effective radius. A 26.6 cm tire rolling radius and a wheel loading of 390 kg were employed. The test procedure included the following: pre-burnish effectiveness checks (at 50, 80, and 110 km/h for deceleration rates of 10, 15, and 20 ft/sec.$^2$ beginning with an initial rotor temperature of 100 C); 100 burnish stops (64–0 km/h at 15 ft/sec.$^2$ from 100 C initial rotor temperature), post-burnish effectiveness, 50 stops at 200 C, 50 stops at 300 C effectiveness, 50 stops at 400 C, post-400 C effectiveness, 50 stops at 500 C, post-500 C effectiveness, 50 reburnish stops at 100 C, and a final effectiveness. The data given in FIGS. 1–24 give the burnish (100 C), 200 C, 300 C, 400 C, and 500 C steady state friction levels and burnish (100 C), 200 C, 300 C, 400 C, 500 C, and reburnish wear values.

The coefficient of friction was measured and indicated as curve 100 in FIG. 1. The wear of the brake pads experienced at the various temperatures was calculated and illustrated by curve 102 in FIG. 2. It should be noted that the wear rate of composition A is acceptable below 200° C. However, when vehicles equipped with such brakes are repeatedly applied, the thermal energy generated rapidly increases and the wear rate above 300 C reaches an unacceptable level.

Figure 2:
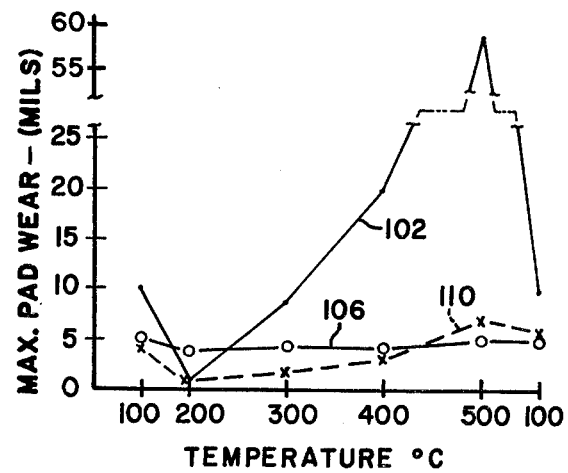
FIGS. 2, 4, 6, 8, 10, 12, 14, 16, 18, 20, 22 and 24 are graphs comparing the wear rates of the friction materials made according to the teachings of this invention with a typical organic friction lining at various temperatures.

Because of the stopping requirement standards established by the Department of Transportation in FMVSS 105-75, the operating maximum temperature generated in bringing a vehicle to a stop during repeated panic stop conditions often reach 400° C. Thus, typical standard asbestos organic friction linings, while producing acceptable coefficients of friction, are damaged since the wear rate increases exponentially above 300° C. as shown in FIG. 2. Thus, it should be evident that the typical asbestos based materials when used as a brake lining do not meet the current friction demands of the automobile industry while maintaining all other properties.

Because of the superior thermal characteristics of carbon and/or graphite over organic friction modifiers, it was decided to substitute 23 percent by weight of carbon, for a portion of the asbestos content in Composition A, to produce composition B shown in FIG. 25. In addition, in composition B the organic modifiers of composition A were eliminated and the metal content (preferably copper powder) and the percentage of barytes increased. Composition B was compounded and processed into a brake friction material pad in the same manner as composition A. The brake pad of Composition B was installed in the caliper of the brake and the inertial dynamometer test performed. The coefficient of friction of composition B is illustrated by curve 104 in FIG. 1 and the wear rate by curve 106 in FIG. 2. As shown in FIG. 2, the addition of the carbon material significantly reduced the high temperature wear of composition A experienced in the 300–500 C range.

It was believed that the brake pad made from composition B was prone to noise and therefore composition B was modified through the addition of rubber scrap and the phenolic resin was reduced to produce composition C, shown in FIG. 25. Composition C then was processed into a brake pad and installed in the caliper of the brake of the inertial dynamometer. As shown in FIG. 1, Composition C produced a coefficient of friction illustrated by curve 108, and the wear rate illustrated by curve 110 in FIG. 2.

While both the coefficient of friction and the wear rate for compositions B and C showed an improvement over composition A, the asbestos material therein is sufficient to cause emission problems in the manufacture and subsequent handling thereof with respect to the Clean Air and Health Standard Acts of 1970 in the United States. It was thereafter decided that compositions B and C should be modified by the substitution of glass and mineral fiber for asbestos in order to conform to these standards.

While most types of glass and mineral fibers should be acceptable for use in a composition of material made according to the teachings of this invention, all the compositions tested were made from commercially available glass fiber, commonly referred to in the industry as E glass, and mineral fiber having the following characteristics: glass fiber composition in weight percent - silica 54.5; alumina 14.5; calcia 17.0; magnesia 4.5; boron oxide 8.5; and sodium oxide 1.0. The fiber diameters may vary from 5 to 15 microns and the fiber lengths may vary from 250 to 10,000 microns. The fiber surface is treated with a silanizing agent to improve the resin-to-fiber adhesion; and mineral fiber composition in weight percent—silica 42.0; alumina 8.0; calcia 35.0; magnesia 8.0; and other oxides 7.0. The fiber diameters may vary from 1 to 15 microns and the fiber lengths may vary from 40 to 1,000 microns. The fiber surface is treated with a silanizing agent to improve the resin-to-fiber adhesion.

Figure 3:
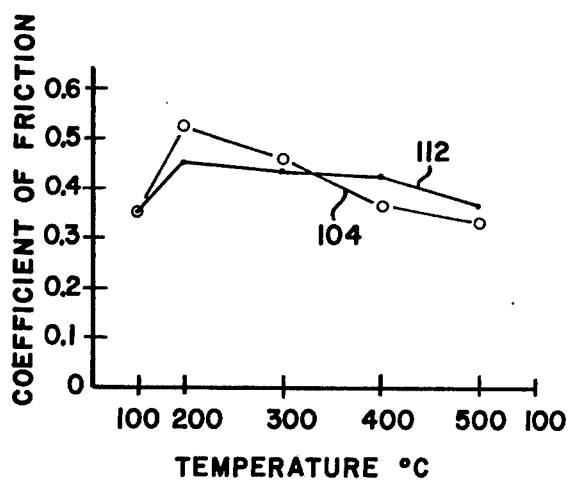
Figure 4:
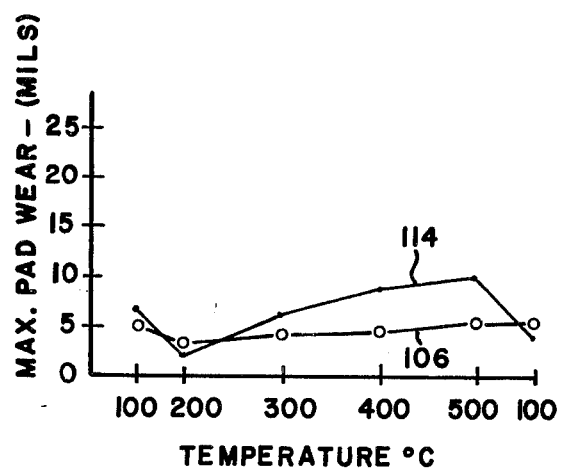

Composition B was modified through equal volume percent substitutions of glass fiber and mineral fiber for the asbestos therein to produce composition D, shown in FIG. 25. Composition D was processed into a brake pad and when tested on the inertial dynamometer, exhibited a coefficient of friction illustrated by curve 112 in FIG. 3 and a wear rate illustrated by curve 114 in FIG. 4. As can be seen in FIG. 3, composition D performed better in the high temperature operational range above 200° C. than the modified base line asbestos composition B; while the wear rate shown in FIG. 4 was similar to that of the modified baseline asbestos composition B illustrated by curve 106.

Figure 5:
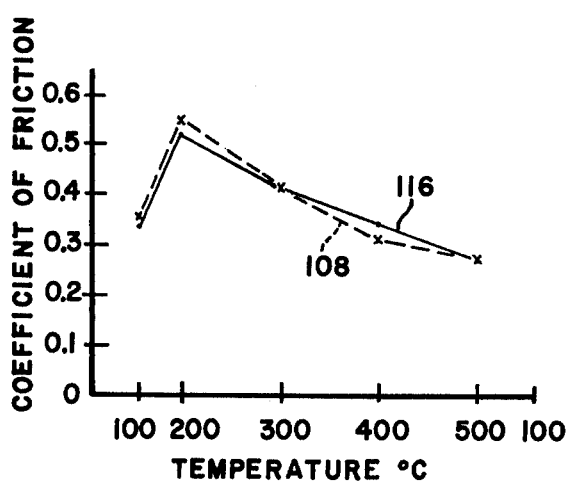
Figure 6:
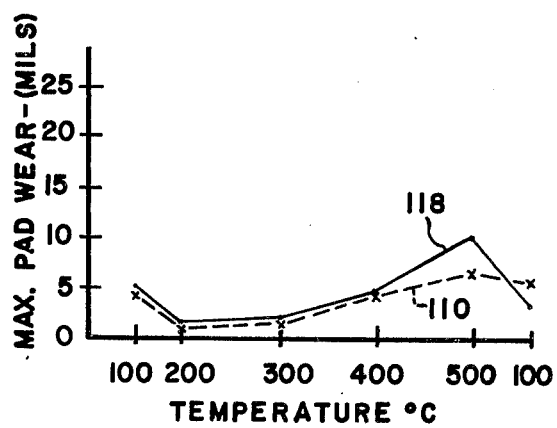

Composition C was similarly modified through equal volume percent substitution of glass fiber and mineral fiber for the asbestos therein to produce composition E, shown in FIG. 25. Composition E was processed into a brake pad and when tested on an inertial dynamometer, exhibited a coefficient of friction illustrated by curve 116 in FIG. 5 and a wear rate illustrated by curve 118 in FIG. 6. As shown in FIGS. 5 and 6, composition E could be considered the full equivalent of composition C in operational characteristics.

On examining the rotor used in testing compositions D and E, rotor degradation or scoring which was common in all prior compositions which included glass fiber, was absent. Thus, the compositions of materials illustrated by the basic compositions D and E, in addition to providing an improved friction lining through the elimination of asbestos could be processed without violating the Clean Air and Health Standards Act of 1970 currently in force in the United States.

Since composition E had an over-all lower wear rate than composition D, it was selected as a base material for modification to establish various limits for the family of high carbon, non-asbestos friction materials discussed hereafter.

Figure 7:
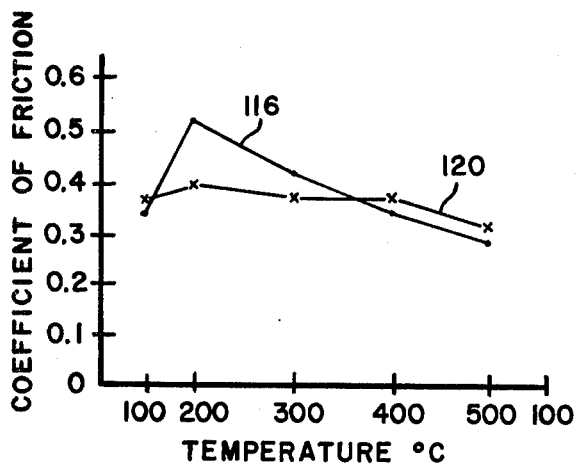
Figure 8:
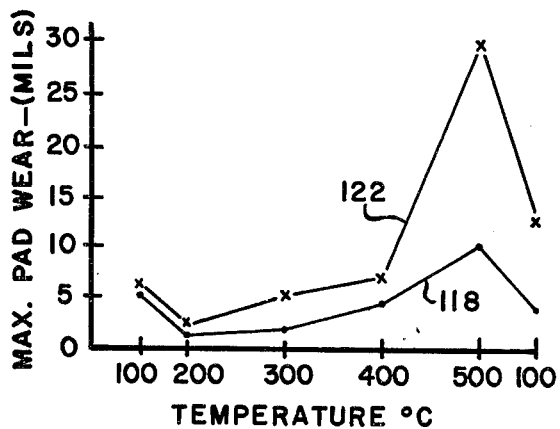

Because of the availability and lower cost of iron particles or powder as compared to copper particles or powder, iron powder was substituted in composition E to produce composition F, shown in FIG. 25. Composition F was processed into a brake pad and when tested on the inertial dynamometer, had a coefficient of friction illustrated by curve 120 in FIG. 7 and a wear rate illustrated by curve 122 in FIG. 8. As shown in FIG. 7, the iron particles in composition F stabilized the coefficient of friction throughout the proposed operating range of the friction material; however, the wear rate illustrated by curve 122 in FIG. 8 did not match the wear rate of composition E, illustrated by curve 118 above 400° C. even though the wear rate was a significant improvement over the asbestos base material in composition A, illustrated by curve 102 in FIG. 2, in the 300-400 operational range.

Under some conditions, friction materials containing a large quantity of metal particles or powder, such as the iron and copper powder contents in compositions D, E and F, produce noise during a brake application. Since graphite and/or carbon have noise attenuating characteristics, it was decided to investigate the effect of variations in the carbon and/or graphite content in compositions E and F to reduce noise created during a brake application.

Figure 9:
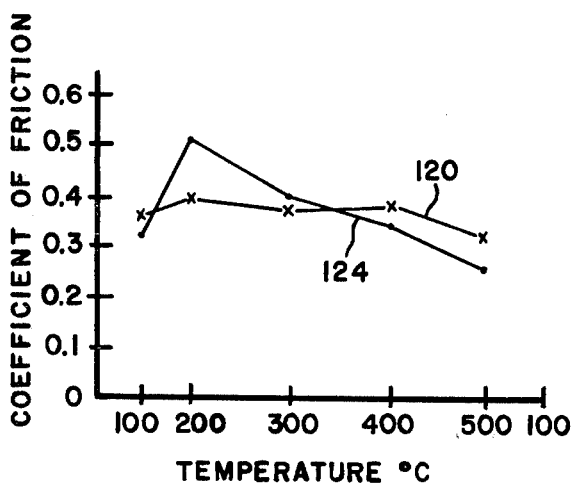
Figure 10:
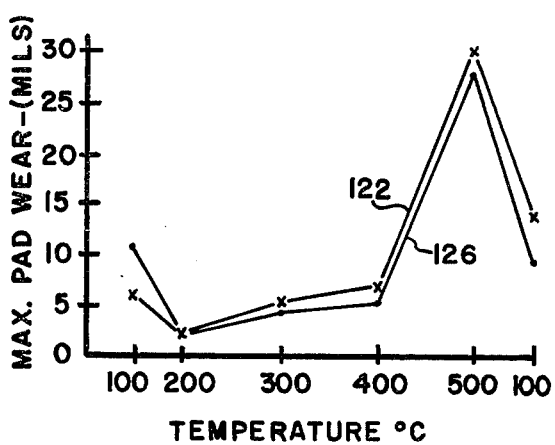

Therefore, a larger amount of carbon particles than is in composition F was added to composition E while barytes was reduced to produce composition G in FIG. 25. Composition G was processed into brake pads and tested on the inertial dynamometer. The coefficient of friction for Composition G is given as curve 124 in FIG. 9 and a wear rate illustrated by curve 126 in FIG. 10. As shown in FIG. 9, composition G produced a friction increase at 200 C with a minor loss at 500 C. The wear rate in curve 126 was virtually identical to the wear rate of composition F given by curve 122.

Since a primary objective of the heavy duty friction material development is to obtain a composition having the best possible wear resistance, as demonstrated by composition E types above at 500 C, further discussion is on compositions containing copper or copper based particles rather than iron particles.

Figure 11:
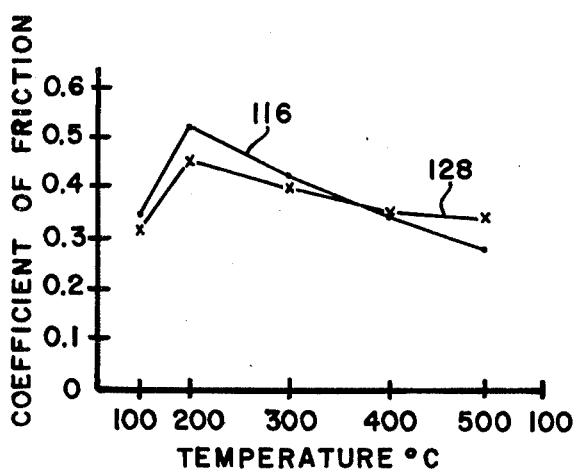
Figure 12:
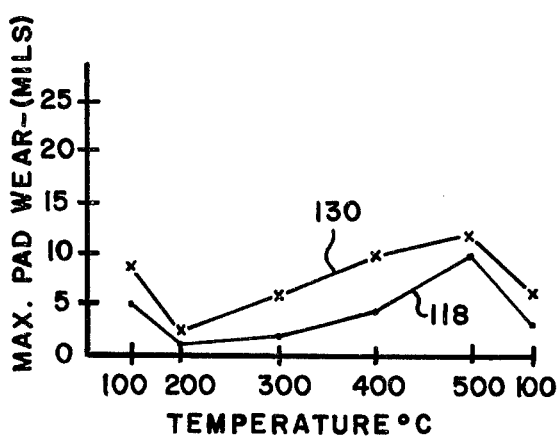
Figure 13:
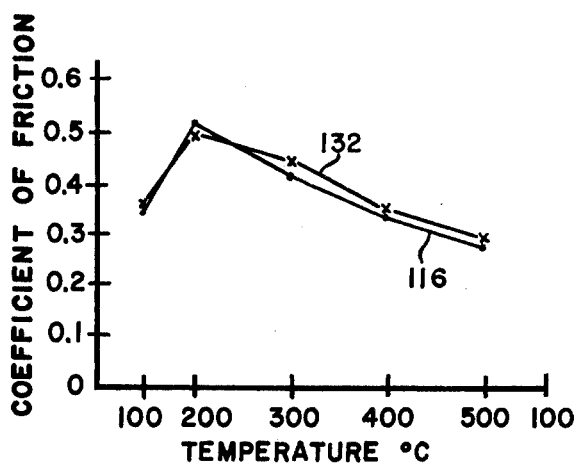
Figure 14:
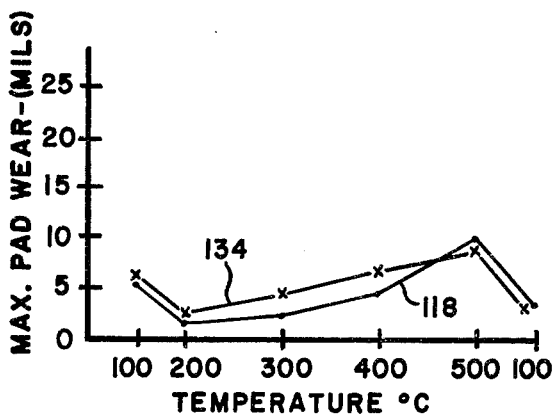
Figure 15:
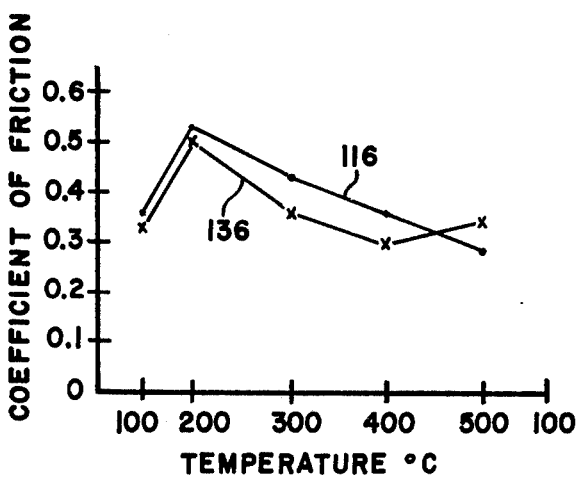
Figure 16:
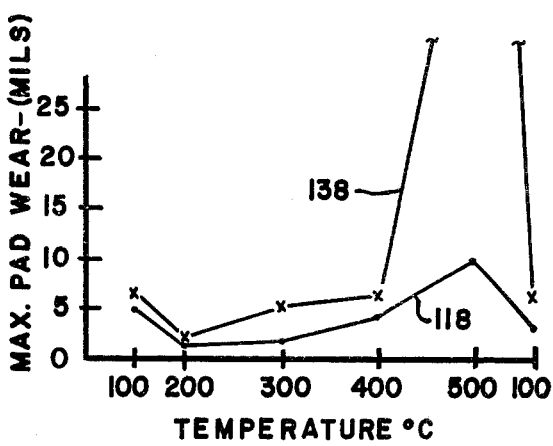

Composition H, shown in FIGS. 25, was derived from composition E by substituting equal amounts of natural and synthetic graphite for the carbon particles in composition E. Composition H, when processed into brake pads and tested on the inertial dynamometer, had a coefficient of friction illustrated by curve 128 in FIG. 11 and a wear rate illustrated by curve 130 in FIG. 12. While the coefficient of friction of composition H as shown in FIG. 11 is virtually similar to E, the wear rate as shown in FIG. 12 deteriorated slightly but is still acceptable for brake pads on most vehicles.

To improve the wear rate of composition H it was suggested that the entire carbon and/or graphite particles or powders therein be made up exclusively of coarse synthetic graphite particles to produce composition I shown in FIG. 25. Composition I, when processed into brake pads and tested on the inertial dynamometer, had a coefficient of friction illustrated by curve 132 in FIG. 13 and a wear rate illustrated by curve 134 in FIG. 14. As seen by comparing curves 116 and 132 in FIG. 13 and curves 118 and 134 in FIG. 14, the coefficient of friction and wear rate of composition I is equivalent to composition E. However, more importantly, it was determined that the noise associated with high metal content pads could be attenuated to an acceptable level through the addition of graphite particles or powder.

In order to evaluate the effect of the metal powder or particles on basic family of high carbon, non-asbestos friction material of composition E, the metal powder or particles were eliminated although a minimum amount of metal oxide in the form of aluminum was retained and the barytes content increased to 18 percent by weight of the total composition to develop composition J, shown in FIG. 25. Composition J was processed into brake pads and when tested in the inertial dynamometer, had a coefficient of friction illustrated by curve 136 in FIG. 15 and a wear rate illustrated by curve 138 in FIG. 16. While the coefficient of friction of comosition J, shown by curve 136, is similar to the basic non-asbestos composition E, the wear rate as shown by curve 138 at 500° C. is poorer than the wear of both composition E shown by curve 118 in FIG. 16 and the asbestos composition A shown by curve 102 in FIG. 2. Thus, composition J would not appear to be acceptable for heavy duty use.

Figure 17:
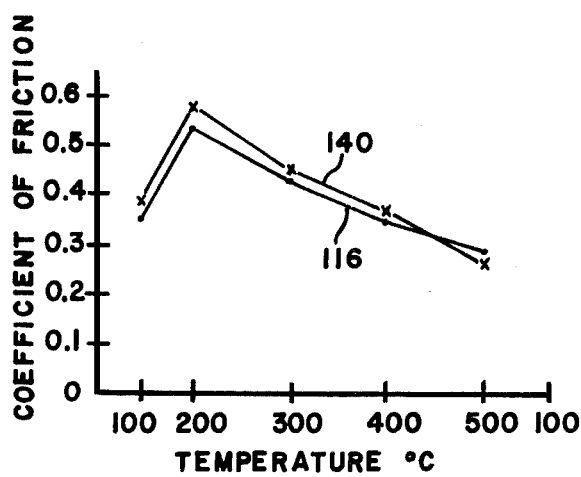
Figure 18:
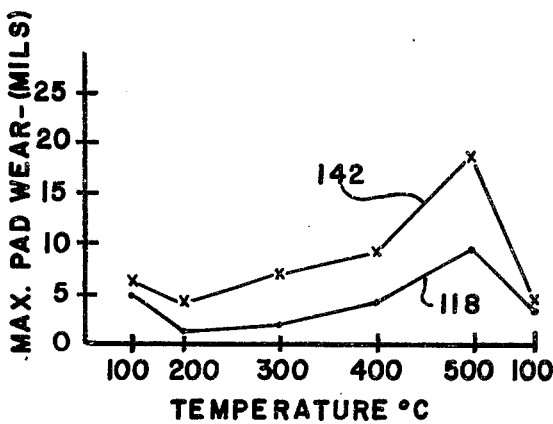
Figure 19:
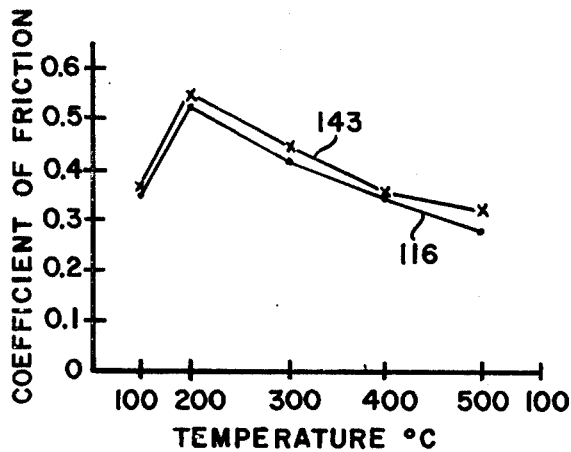

In an effort to increase the coefficient of friction of composition E, it was suggested that a portion of the carbon and/or graphite therein be replaced with cashew nut powder to produce composition K, shown in FIG. 25. Composition K, when processed into brake pads and tested on an inertial dynamometer, had a coefficient of friction illustrated by curve 140 in FIG. 17 and a wear rate illustrated by curve 142 in FIG. 18. As seen in FIGS. 17 and 18, the coefficient of friction of composition K is an improvement over both compositions A, shown in FIG. 1, and identical to composition E shown in FIG. 17, however, the wear rate of composition K is an improvement only over composition A shown in FIG. 2.

Figure 20:
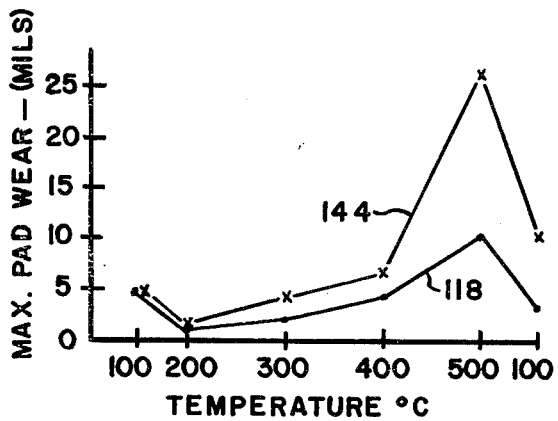

To establish the optimum percentage of the carbon and/or graphite particles or powder in composition E, it was decided to exclude barytes and correspondingly increase the carbon particles to produce composition L, shown in FIG. 25. Composition L, when processed into brake pads and tested on an inertial dynamometer, has a coefficient of friction illustrated by curve 143 in FIG. 19 and a wear rate illustrated by curve 144 in FIG. 20. As shown in FIG. 20, the wear rate is equivalent to composition E illustrated by curve 118 up to 400° C.

Figure 21:
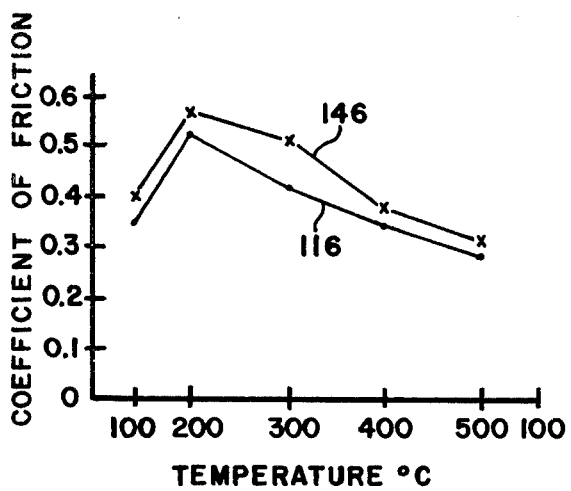
Figure 22:
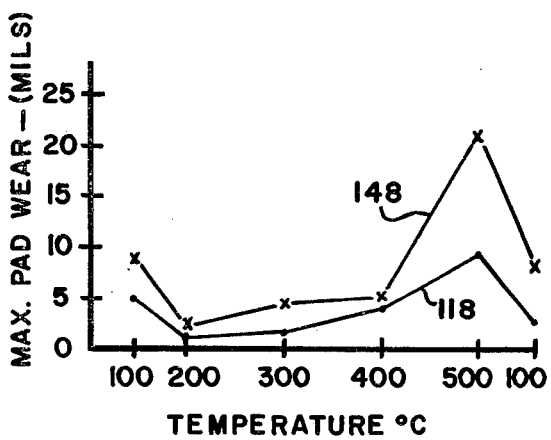
Figure 23:
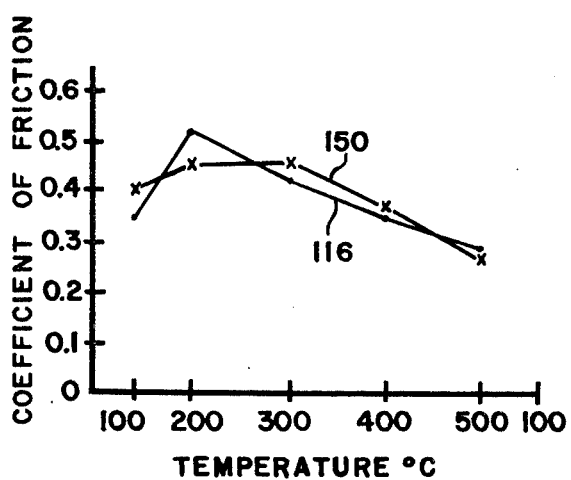
Figure 24:
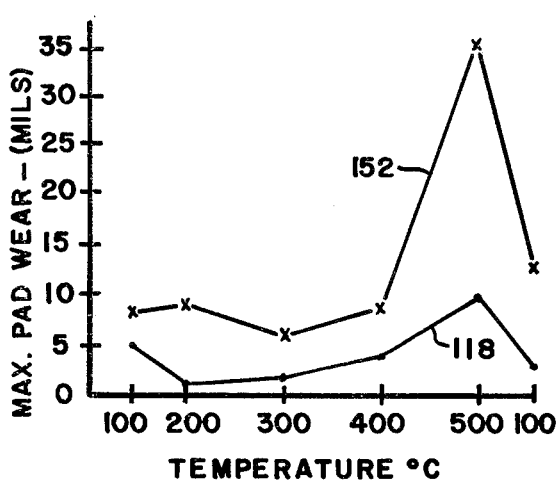

Since the high temperature wear rate of composition L is substantially stable between 200°-400° C., it was decided that composition E could be modified through a reduction in the mineral fiber content while further increasing the carbon particle content with the volume percentage of the remaining ingredients held constant to produce composition M shown in FIG. 25. Composition M, when processed into a brake disc pad and tested on the inertial dynamometer, has a coefficient of friction illustrated by curve 146 in FIG. 21 and a wear rate illustrated by curve 148 in FIG. 22. As seen in FIG. 21, the coefficient of friction for composition M is higher than basic composition E throughout the temperature range and the 100-400 C wear rate is substantially equivalent to composition L.

Since brass chips or particles are normally more readily available at a lower cost than copper particles or copper oxide, it was decided to substitute brass for the copper particles in composition E to produce composition N as shown in FIG. 25. Composition N, when processed into brake pads and tested on the inertial dynamometer, had a coefficient of friction illustrated by curve 150 in FIG. 23 and a wear rate illustrated by curve 152 in FIG. 24. While the coefficient of friction is virtually identical to composition E, the wear rate is uniformly poorer throughout the temperature range.

From the foregoing tests of brake pads constructed of high carbon or graphite compositions, the following conclusions were ascertained:

All compositions tested that included from 17–35% by weight of carbon and/or graphite particles exhibited lower high temperature wear than the prior art asbestos base composition;

Composition of materials which include glass and mineral fiber in the presence of carbon have a higher wear rate when metal powder or particle modifiers are excluded.

Substitution of glass fiber and mineral fiber for asbestos in friction material compositions in the presence of a substantially equal amount of carbon and/or graphite produce a composition that has a stable coefficient of friction and low wear when used in a brake lining in brake applications that generate thermal energy up to 500° C.

Noise problems associated with high metal content in friction material compositions may be attenuated downward through the inclusion of synthetic graphite particles to the brake lining compositions;

The coefficient of friction of the glass and mineral fiber base compsition is enhanced through a combination of cured cashew nut shell liquid powder and carbon particles;

The substitution of iron particles or iron oxide for copper particles or copper oxide in the glass fiber and mineral fiber base composition in the presence of carbon and/or graphite particles produced a composition having a substantially uniform coefficient of friction in the operating range of a vehicle brake; and The described composition of friction materials for use as braking lining that include glass or mineral fibers and a high carbon or graphite content do not score or degrade a corresponding brake surface.

Therefore, based on the above examples and the test results illustrated in the drawings, we claim:

1. A friction material consisting of a mixture of:
   20–33% by weight of fibers selected from a group consisting of glass fiber, asbestos and other mineral fibers;
   4–22% by weight of metal or metal oxide particles;
   0–7% by weight of organic modifiers;
   7–24% by weight of inorganic modifiers;
   18–34% by weight of carbon or graphite particles; and
   8–14% by weight of a thermosetting phenolic resin, said thermosetting phenolic resin being cured to form a matrix for holding the selected fibers, metal or metal oxide particles, the organic and inorganic modifiers and carbon or graphite particles in a fixed relationship, said carbon or graphite particles modifying the abrasive effect of said fibers on a mating surface to prevent degradation thereof.

2. The friction material, as recited in claim 1, wherein said metal or metal oxide particles are selected from a group consisting of iron, iron oxide, copper, copper oxide and brass.

3. The friction material, as recited in claim 2, wherein said 4–22% by weight of metal powders or metal oxide includes at least 5% by weight of iron powder.

4. The friction material, as recited in claim 2, wherein said 4–22% by weight of metal powders or metal oxide includes at least 10% by weight of copper powder.

5. The friction material, as recited in claim 4, wherein said fibers include at least 14% by weight of glass fiber.

6. The friction matrial, as recited in claim 4, wherein said fibers include a combination of equal amount by volume of glass fiber and other mineral fibers.

7. The friction material, as recited in claim 4, wherein said fibers include a combination of 14% by weight of glass fiber and 14% by weight of other mineral fibers.

8. The friction material, as recited in claim 5, wherein the amount of said carbon or graphite particles present in the mixture is about 23% by weight.

9. The friction material, as recited in claim 6, wherein the amount of said carbon or graphite particles present in the mixture is at least 18% by weight.

10. The friction material, as recited in claim 7, wherein the amount of said resin present in the mixture is about 8% by weight.

11. The friction material, as recited in claim 1, wherein said fibers include at least 20% by weight of asbestos.

12. The friction material, as recited in claim 1, wherein said fibers include 20–33% by weight of absestos.

* * * * *